(12) United States Patent
Durbin

(10) Patent No.: US 7,571,860 B2
(45) Date of Patent: *Aug. 11, 2009

(54) READER FOR DECODING TWO-DIMENSIONAL OPTICALLY READABLE INFORMATION

(75) Inventor: Dennis A. Durbin, Cedar Rapids, IA (US)

(73) Assignee: Intermec IP Corp., Everett, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/852,694

(22) Filed: Sep. 10, 2007

(65) Prior Publication Data

US 2008/0023561 A1    Jan. 31, 2008

Related U.S. Application Data

(63) Continuation of application No. 10/701,199, filed on Nov. 4, 2003, now Pat. No. 7,347,375, which is a continuation of application No. 09/961,697, filed on Sep. 24, 2001, now Pat. No. 6,641,046, which is a continuation of application No. 09/170,689, filed on Oct. 13, 1998, now Pat. No. 6,330,975, which is a continuation of application No. 08/703,564, filed on Aug. 27, 1996, now Pat. No. 5,821,523, which is a continuation-in-part of application No. 08/461,605, filed on Jun. 5, 1995, now Pat. No. 5,902,988, which is a continuation of application No. 08/277,132, filed on Jul. 19, 1994, now abandoned, which is a continuation of application No. 07/919,488, filed on Jul. 27, 1992, now abandoned, and a continuation-in-part of application No. 07/889,705, filed on May 26, 1992, now abandoned, which is a continuation-in-part of application No. 07/849,771, filed on Mar. 12, 1992, now abandoned.

(51) Int. Cl.
*G06K 7/10*    (2006.01)

(52) U.S. Cl. ............................. 235/472.01; 235/462.01; 235/462.09

(58) Field of Classification Search ............ 235/472.01, 235/462.01, 462.09, 462.2
See application file for complete search history.

(56) References Cited

U.S. PATENT DOCUMENTS

| | | | | |
|---|---|---|---|---|
| 5,019,699 A * | 5/1991 | Koenck | ................. | 235/472.01 |
| 5,155,343 A * | 10/1992 | Chandler et al. | ........ | 235/462.09 |
| 5,513,264 A * | 4/1996 | Wang et al. | .................... | 380/51 |
| 5,691,528 A * | 11/1997 | Wyatt et al. | ............ | 235/462.07 |
| 5,773,806 A * | 6/1998 | Longacre, Jr. | ............ | 235/462.1 |

\* cited by examiner

*Primary Examiner*—Ahshik Kim
(74) *Attorney, Agent, or Firm*—Shook, Hardy & Bacon L.L.P.

(57) ABSTRACT

An apparatus and method for reading optical information including a photosensitive system oriented to capture optical information. Also included is an optical system focusing optical information onto the photosensitive system, and a display oriented to display optical information captured by the photosensitive system. The apparatus also includes a portable, hand-held housing.

18 Claims, 6 Drawing Sheets

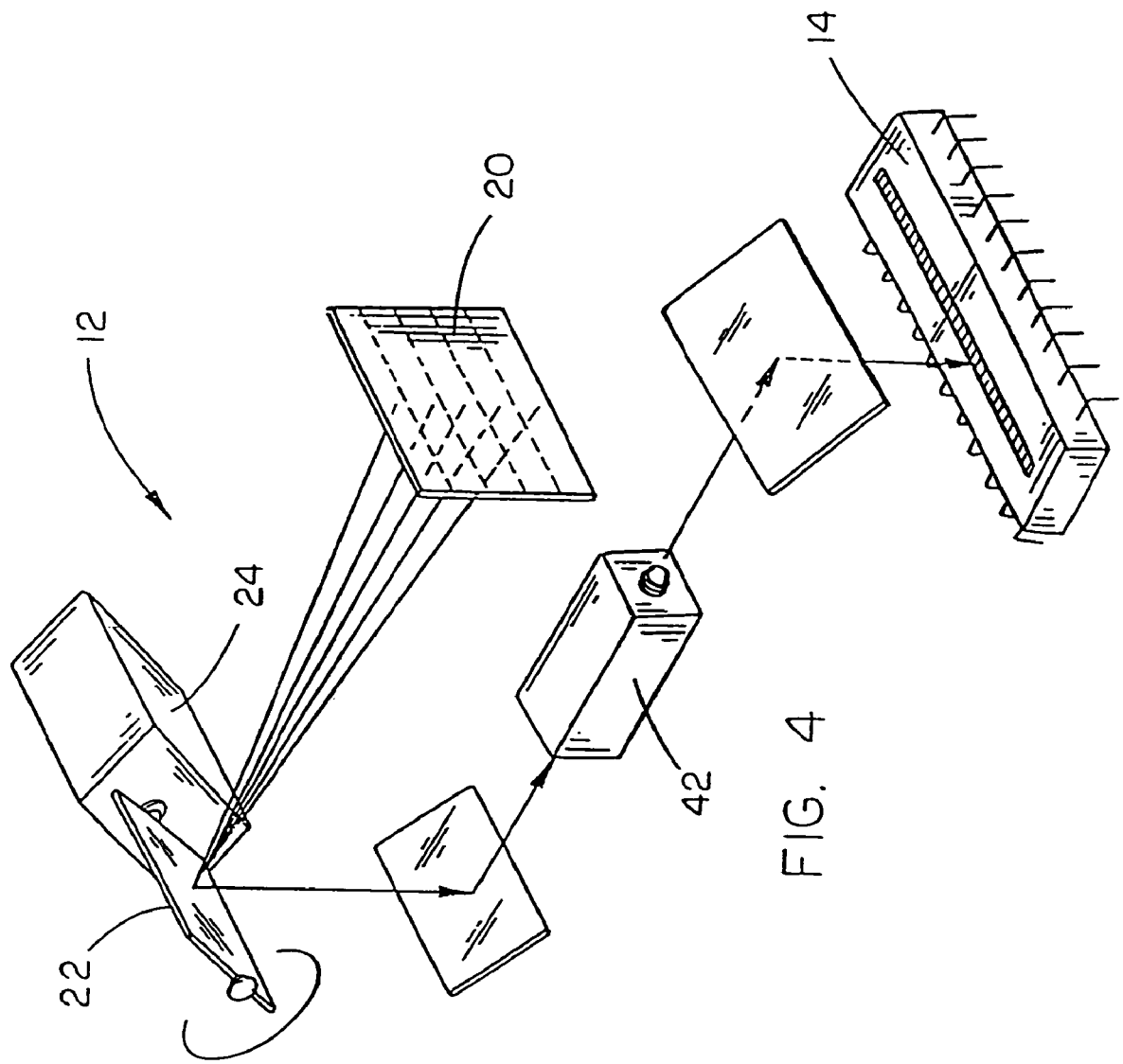

READER FOR DECODING TWO-DIMENSIONAL OPTICALLY READABLE INFORMATION

CROSS REFERENCE TO RELATED APPLICATIONS

The present application is a continuation of U.S. application Ser. No. 10/701,199, filed Nov. 4, 2003, now U.S. Pat. No. 7,347,375, which is a continuation of U.S. application Ser. No. 09/961,697, filed Sep. 24, 2001, now U.S. Pat. No. 6,641,046, which is a continuation of U.S. application Ser. No. 09/170,689, filed Oct. 13, 1998, now U.S. Pat. No. 6,330,975, which is a continuation of application Ser. No. 08/703,564, filed Aug. 27, 1996, now U.S. Pat. No. 5,821,523, which is a continuation-in-part of application Ser. No. 08/461,605, filed Jun. 5, 1995, now U.S. Pat. No. 5,902,988, which is a continuation of U.S. application Ser. No. 08/277,132, filed Jul. 19, 1994, now abandoned, which is itself a continuation of U.S. application Ser. No. 07/919,488, filed Jul. 27, 1992, now abandoned, which is a continuation-in-part of two applications: (1) U.S. application Ser. No. 07/849,771, filed Mar. 12, 1992, now abandoned; and (2) U.S. application Ser. No. 07/889,705, filed May 26, 1992, now abandoned. U.S. application Ser. No. 07/889,705 is a continuation-in-part of U.S. application Ser. No. 07/849,771 field on Mar. 12, 1992 now abandoned application Ser. No. 08/284,883, filed Jul. 28, 1994, now U.S. Pat. 5,414,251, is a continuation of the application Ser. No. 07/849,771.

INCORPORATION BY REFERENCE

The previously identified patent applications in the section entitled Cross References to Related Applications which are now U.S. Pat. Nos. 5,414,251; 5,821,523; 5,902,988; 6,330,975; and 6,641,046 are hereby incorporated herein by reference in their entirety.

BACKGROUND

1. Technical Field

The present invention is directed to optical information readers and particularly to readers adapted to selectively decode two-dimensional optical information sets.

2. Description of the Prior Art

Conventional bar code symbols have small data storage capabilities. This reduces the utility of conventional bar code scanner and reader systems. For example, the 11 digit Uniform Pricing Code found on most supermarket items acts as an identifying number which may be utilized to access information in a database. Codes of this type do not carry information along their vertical axis, and are therefore, less prone to skewing errors during decoding.

Two-dimensional bar code symbols or "portable data files" have recently been developed. With codes of this type access to a database is not required since the code contains the information which would normally be 'keyed for in a database. Since reliance on a database is not required, information may be accessed and exchanged more readily and reliably. However, in order to decode two-dimensional codes, a more sophisticated apparatus is required. This is primarily true since normal vertical code redundancy is not present, making code registration, orientation and condition very important.

Several two-dimensional coding standards have been proposed, e.g., Code 49, 16K, Identicode MLC-2D, and Code PDF417. While such codes are capable of storing information such as price, name of product, manufacturer, weight, expiration date, inventory data, shipping information, and the like; apparatus which assist the user in aiming and decoding two-dimensional codes are not currently available. For example, two-dimensional codes might consist of a stack of conventional linear codes. Each line may contain different information, such as (1) pricing information, (2) product name, (3) name of the manufacturer, (4) product weight, (5) expiration date, (6) inventory data, (7) shipping information, and the like. Additionally, a user may require the ability to selectively store or send portions of the decoded bar code symbol.

3. Objects of the Invention

Therefore, a principal object of the present invention is to provide a reader adapted to selectively read two-dimensional optical information sets.

Another object of the present invention is to provide a reader adapted to selectively read two-dimensional optical information sets in ambient light.

Another object of the present invention is to provide a reader adapted to selectively read two-dimensional optical information sets from a wide range of distances.

Another object of the present invention is to provide a reader adapted to selectively read optical information while assisting a user in aiming the reader.

Another object of the present invention is to provide a reader adapted to selectively read two-dimensional optical information sets which is economical to manufacture and durable in use.

Another object of the present invention is to provide a reader adapted to selectively read two-dimensional optical information sets which is efficient in operation, simple in construction, easy to use and trouble free. These and other objects will be apparent to those skilled in the art from the following disclosure.

SUMMARY OF THE INVENTION

The present invention discloses a novel reader for reading optical information. In one exemplary embodiment the invention includes a housing for supporting a photosensitive array associated with an optical string means which is adapted to focus optical information on the array. Also provided are array and optical string control means for controlling the array and optical string such that the output of selected images on the array may be processed via pattern recognition means. Images on the array may be presented to the user by a display means. Images recognized to contain decodable optical information may be displayed and highlighted on the display means. In this fashion a user is assisted in aiming, recognizing and confirming the decodability of a coded image incident on the array.

BRIEF DESCRIPTION OF THE DRAWINGS

Other objects and advantages of the invention will be apparent upon reading the following detailed description and upon reference to the drawings; in which:

FIG. 4 is a highly diagrammatic perspective view of the image capturing elements of a linear array exemplary embodiment of the present invention;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 1:
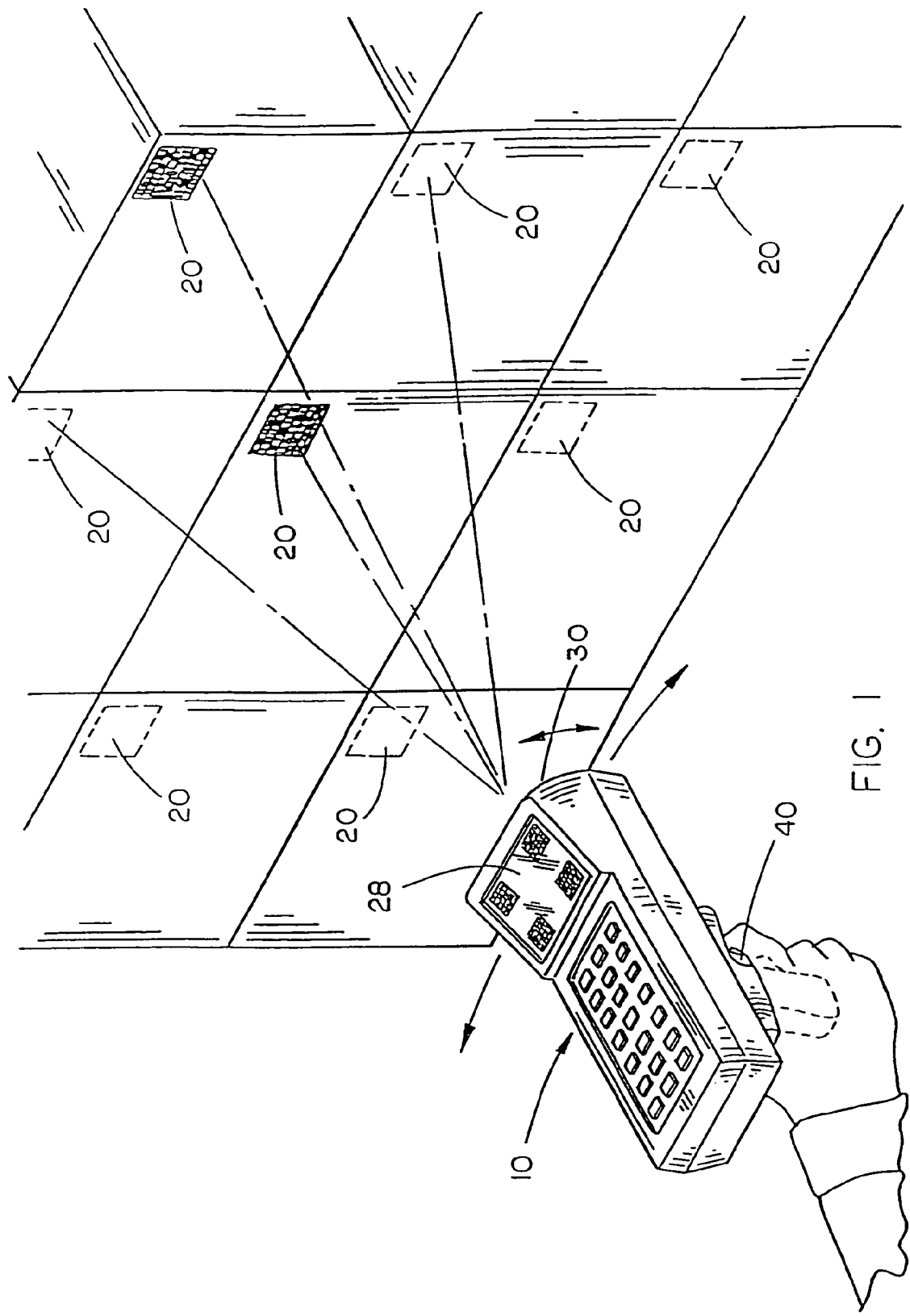
FIG. 1 is a perspective view of a preferred embodiment of the two-dimensional optical information reader showing a user being assisted by the display of the reader in aiming.
Figure 3:
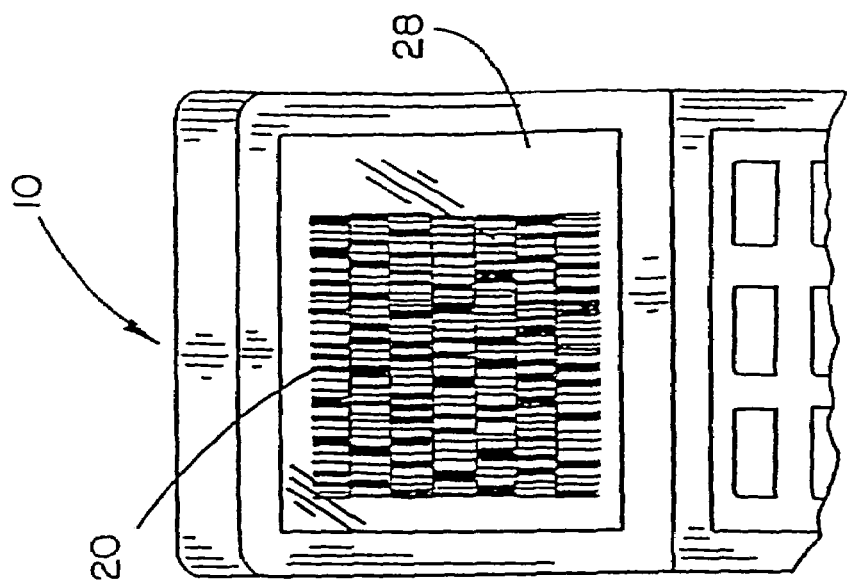
FIG. 3 is a partial-top perspective view of the reader illustrating the display wherein the display indicates to a user that a two-dimensional, decodable bar code symbol is centered in view and available for reading.
Figure 2:
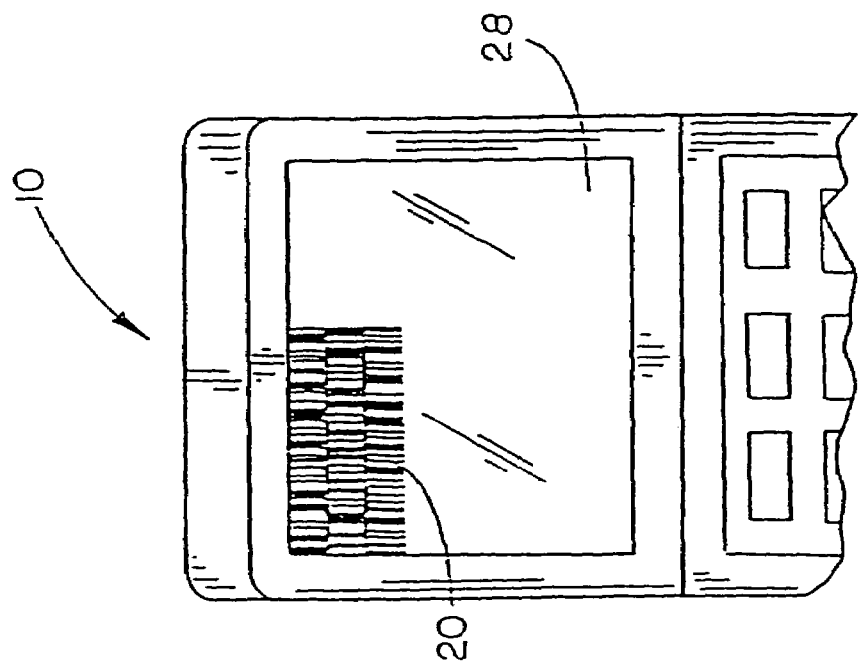
FIG. 2 is a partial top perspective view of the reader illustrating the display wherein the display indicates to a user that a two-dimensional, decodable, bar code symbol may be read if the user adjusts the aim of the reader to the left and above.
Figure 5:
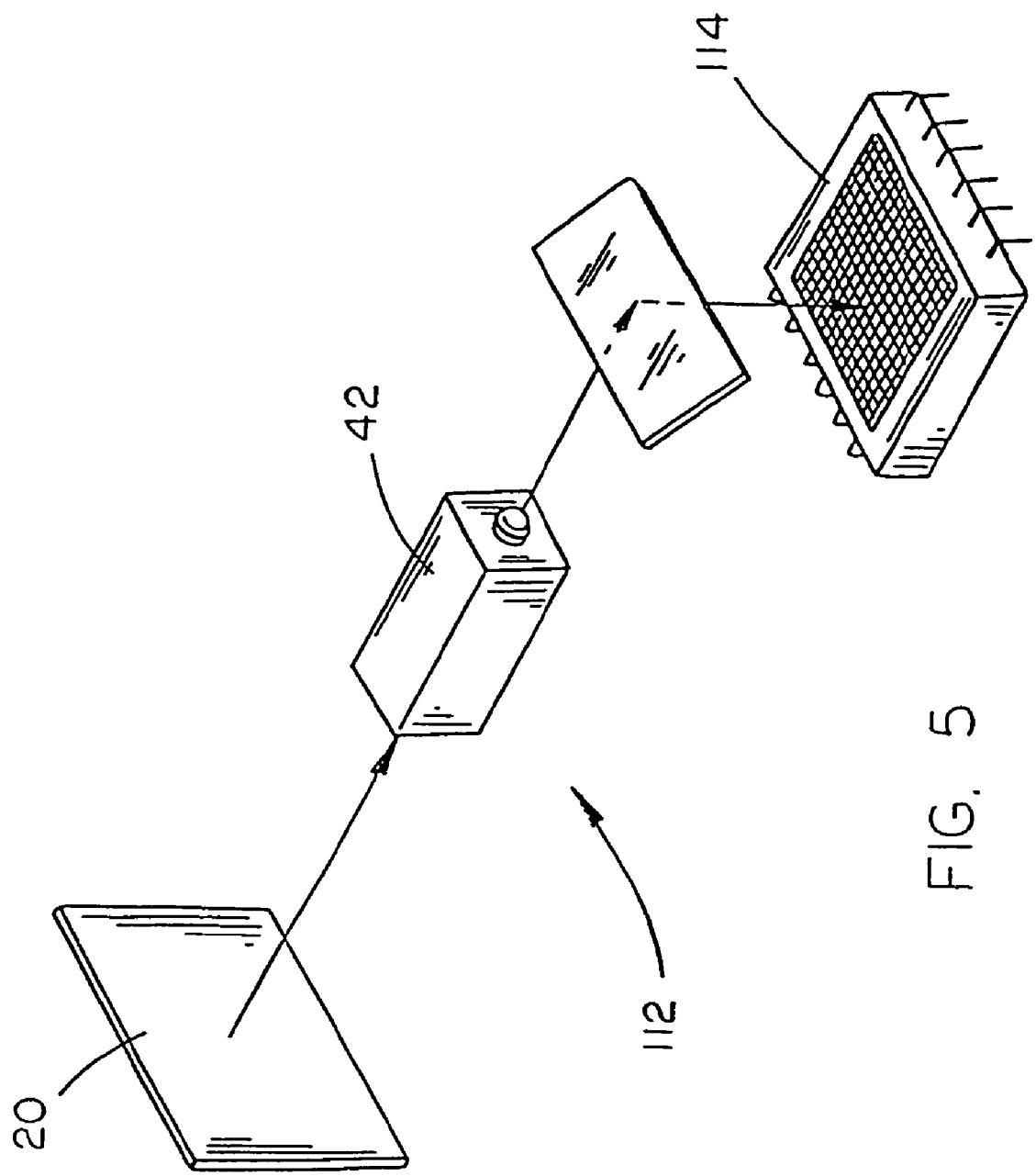
FIG. 5 is a highly diagrammatic perspective view of the image capturing elements of a two-dimensional array exemplary embodiment of the present invention.
Figure 6:
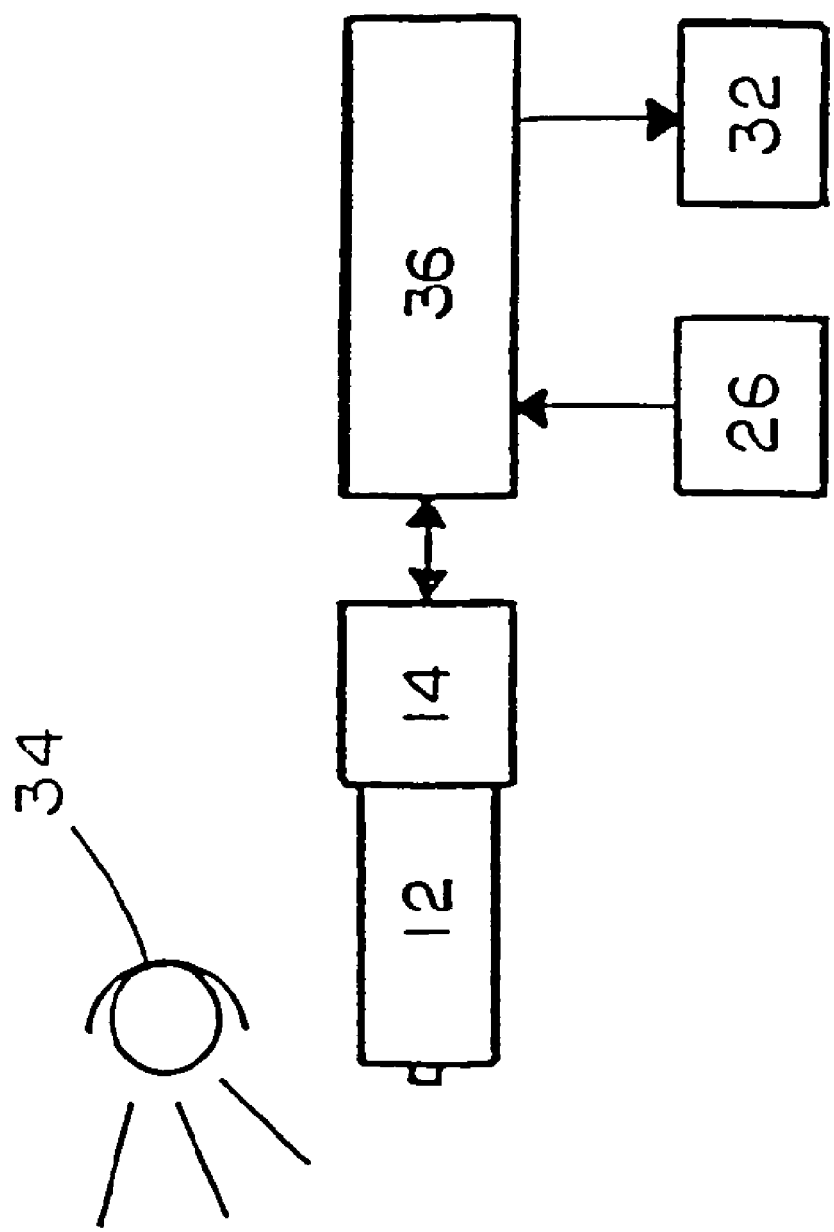
FIG. 6 is a block diagram illustrating the various components of the present invention.
Figure 7:
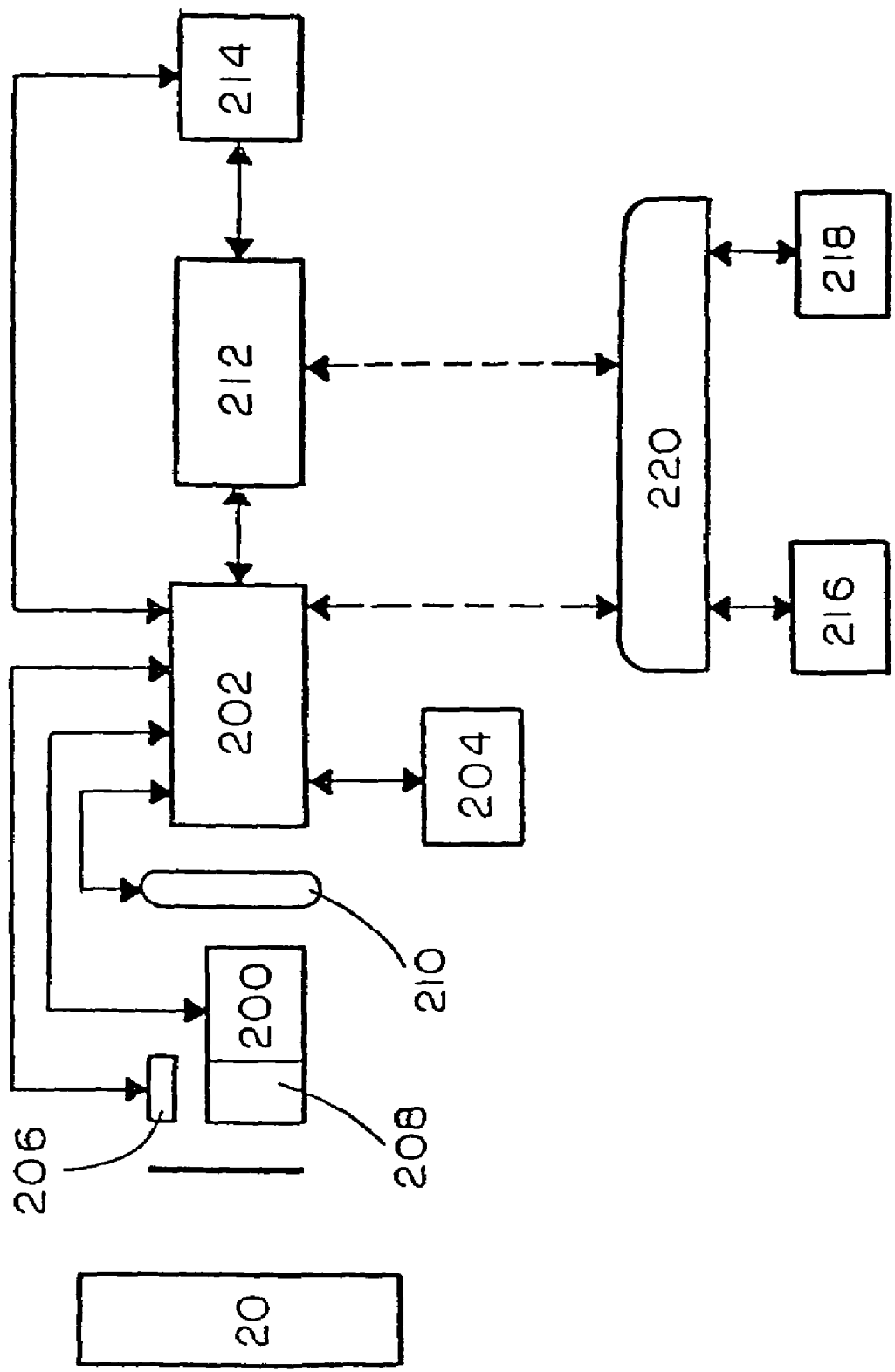
FIG. 7 is a more detailed diagram illustrating the various components of the present invention.

The detailed description of FIGS. 1-7 as found in U.S. Pat. No. 5,902,988 from col. 2, line 63, to col. 7, line 67, is hereby incorporated herein by reference in its entirety.

The detailed description and drawings of U.S. Pat. No. 5,821,523 are also incorporated herein by reference in their entirety as showing in further embodiments within the scope of the present invention.

INCORPORATION BY REFERENCE

The present invention may be construed for use in a docking type system for recharging/communicating with the apparatus disclosed herein. A docking station which might be adapted for use with the present invention is disclosed in U.S. application Ser. No. 07/451,322, filed Dec. 15, 1989, (now U.S. Pat. No. 5,227,614), which application is incorporated herein by reference in its entirety as illustrating arrangements which may be embodied in a peripheral shell 260 (FIG. 10; Ser. No. 07/451,322). Likewise, the disclosure of U.S. Pat. No. 4,877,949, issued Oct. 31, 1989, is also incorporated herein by reference, in its entirety, as illustrating means for focusing an image of optically readable information over a substantial range of distances. Also incorporated herein by reference is U.S. application Ser. No. 07/451,322, filed Dec. 15, 1989, (now U.S. Pat. No. 5,227,614) as illustrating a display 14 (FIGS. 13 and 14) adapted to assist a user of an apparatus in reading optically readable information. Finally, also incorporated in its entirety herein by reference is U.S. application Ser. No. 07/143,921, filed Jan. 14, 1988, as illustrating optically readable information digitizing and decoding means (FIGS. 7 through 18).

While the invention has been described with a certain degree of particularity, it is manifest that many changes may be made in the details of construction and the arrangement of components without departing from the spirit and scope of the disclosure. It is understood that the invention is not limited to the embodiments set forth herein for purposes of exemplification, but is to be limited only by the scope of the appended claims including the full range of equivalency to which each element thereof is entitled.

Thus, there has been shown and described an improved optical information reader which accomplishes at least all of the stated objects.

The invention claimed is:

1. An apparatus for reading two-dimensional optical information, comprising:
    a housing having a light-transmissive portal;
    a photosensitive array, located within said housing to capture two-dimensional optical information;
    an optical system, positioned relative to said photosensitive array and said light-transmissive portal so as to focus two-dimensional optical information onto said photosensitive array;
    a memory system, coupled with said photosensitive array to store output from said photosensitive array; and
    a display system, coupled with said memory system, to display an image of optical information captured by said photosensitive array, wherein the display of the image of optical information facilitates aiming said apparatus at a specific two-dimensional optical information indicia to be read at least partially with the aid of information displayed on said system.

2. The apparatus of claim 1, further comprising a photosensitive array control system, coupled with said photosensitive array.

3. The apparatus of claim 1, further comprising a user feedback system to assist reading of two-dimensional optical information.

4. The apparatus of claim 1, further comprising:
    a pattern recognition system configured to assist a user in recognizing two-dimensional optical information; and
    wherein said display system is associated with said housing to display two-dimensional optical information as processed by said pattern recognition facility.

5. The apparatus of claim 1, wherein said housing is of a size and shape suited for hand-held operation.

6. The apparatus of claim 1, further comprising a rastering device configured to raster one-dimensional image segments of two-dimensional optical information onto said photosensitive array, wherein said photosensitive array comprises a one-dimensional array.

7. The apparatus of claim 1, further comprising a zoom system.

8. The apparatus of claim 1, further comprising a focusing system configured to variably focus two-dimensional optical information onto said photosensitive array.

9. The apparatus of claim 1, further comprising a decoding system configured to decode two-dimensional optical information.

10. An apparatus for reading optical information, comprising:
    a photosensitive system oriented to capture optical information;
    an optical system associated with said photosensitive system for directing optical information onto said photosensitive system;
    a display coupled with said photosensitive system and oriented to display optical information captured by said photosensitive system, wherein the display facilitates aiming said photosensitive system; and
    a portable, hand-held housing supporting said photosensitive system, said optical system and said display.

11. The apparatus of claim 10, further comprising a power supply for providing operating power.

12. The apparatus of claim 10, further comprising:
    a pattern recognition system configured to assist a user in recognizing optical information; and
    wherein said display is associated with said pattern recognition system to display optical information as processed by said pattern recognition system.

13. The apparatus of claim 10, further comprising a user feedback system to facilitate user control over the apparatus.

14. The apparatus of claim 10, further comprising a raster device configured to raster one-dimensional image segments of two-dimensional optical indicia onto said one-dimensional array, wherein said photosensitive system comprises a one-dimensional array of photosensitive regions.

15. The apparatus of claim 10, wherein said photosensitive system is a two-dimensional array of photosensitive regions.

16. The apparatus of claim 10, further comprising a zoom system.

17. The apparatus of claim 10, further comprising a focusing system configured to variably focus optical information onto said photosensitive system.

18. A two-dimensional optical information reading apparatus, comprising:
   means for housing having a light-transmissive portal;
   means for sensing two-dimensional optical information, located within said means for housing;
   means for directing two-dimensional optical information onto said means for sensing two-dimensional optical information;
   means for providing a memory, coupled with said means for sensing two-dimensional optical information, to store output from said means for sensing two-dimensional optical information; and
   means for displaying optical information, coupled with said means for providing a memory, to display optical information captured by said means for sensing two-dimensional optical information, wherein said means for displaying optical information facilitates targeting a specific two-dimensional optical information indicia to be read at least partially with the aid of information displayed on said means for displaying optical information.

* * * * *